United States Patent
Gigliotti et al.

(10) Patent No.: US 9,857,177 B1
(45) Date of Patent: Jan. 2, 2018

(54) PERSONALIZED POINTS OF INTEREST FOR MAPPING APPLICATIONS

(75) Inventors: Samuel S. Gigliotti, Seattle, WA (US); Ronald A. Kornfeld, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/528,485

(22) Filed: Jun. 20, 2012

(51) Int. Cl.
*G01C 21/00* (2006.01)

(52) U.S. Cl.
CPC .................................. *G01C 21/00* (2013.01)

(58) Field of Classification Search
CPC ................ G01C 21/00; G01C 21/3679; G01C 21/3682; G01C 21/3685
USPC .......................................................... 701/532
See application file for complete search history.

(56) References Cited

U.S. PATENT DOCUMENTS

| | | | |
|---|---|---|---|
| 8,180,379 B2 | 5/2012 | Forstall | |
| 8,326,858 B2 | 12/2012 | Jenson et al. | |
| 8,369,867 B2 | 2/2013 | Van Os | |
| 8,509,412 B2 | 8/2013 | Sheha et al. | |
| 2005/0097005 A1* | 5/2005 | Fargo | G06Q 30/00 705/26.62 |
| 2008/0040678 A1* | 2/2008 | Crump | 715/763 |
| 2008/0070593 A1* | 3/2008 | Altman et al. | 455/457 |
| 2009/0005021 A1 | 1/2009 | Forstall et al. | |
| 2009/0005070 A1 | 1/2009 | Forstall et al. | |
| 2009/0210148 A1 | 8/2009 | Jayanthi | |
| 2009/0293069 A1 | 11/2009 | Yang et al. | |
| 2009/0319181 A1* | 12/2009 | Khosravy et al. | 701/208 |
| 2010/0087209 A1* | 4/2010 | Holm | G01C 21/3629 455/457 |
| 2011/0219105 A1 | 9/2011 | Kryze et al. | |
| 2011/0313657 A1* | 12/2011 | Myllymaki | G01C 21/3682 701/438 |
| 2012/0143498 A1 | 6/2012 | Zubas et al. | |
| 2012/0295639 A1* | 11/2012 | Fitoussi et al. | 455/456.3 |
| 2015/0117796 A1* | 4/2015 | Hile | G06F 17/30241 382/305 |

OTHER PUBLICATIONS

Non-Final Office Action dated Dec. 19, 2013; in corresponding U.S. Appl. No. 13/528,471.
"Final Office Action dated Mar. 5, 2015," U.S. Appl. No. 13/528,471, 29 pages.
"Saving Custom Maps with My Maps," Jul. 3, 2010, 2 pages, Mapquest.com.

* cited by examiner

*Primary Examiner* — Michael D Lang
(74) *Attorney, Agent, or Firm* — Polsinelli LLP

(57) ABSTRACT

A mapping service can expose a set of APIs or other interfaces that can enable information from third parties to be incorporated into a mapping application executing on various computing devices, as well as to enable the mapping data to be embedded in applications associated with the third parties. This information can relate to points of interest (POI) that can be provided on a map displayed through the mapping application. In some embodiments the POI can be selected based upon information known about the user, in order to personalize the POI displayed and enable the selection of POI to likely be more of interest to the user. In some embodiments, the user can also select to receive types of POI from the third party providers, which can be incorporated with the mapping data and, in at least some embodiments can still be selected based on information known about the user.

23 Claims, 6 Drawing Sheets

… (1) US 9,857,177 B1

PERSONALIZED POINTS OF INTEREST FOR MAPPING APPLICATIONS

BACKGROUND

Many people utilize computer-based mapping applications to obtain the locations of, and directions to, various locations, as well as to locate places near a current or specific location. A person wanting to perform such a task typically opens an application, inputs the necessary information (such as a location or point of interest) and receives location information, driving directions, nearby points of interest (POI) as determined by the mapping application provider, and other such information. The user might be interested in specific types of location or points of interest that the user would like to include with the mapping information, but the point of interest information provided with the mapping application typically is selected by a provider of the mapping application and often relates specifically to businesses, public spaces, government buildings, and other such locations. The POI is typically not customized for the user, other than the user potentially being able to select subsets of the already-determined POI to obtain on a map. Further, there is no way to access data from third parties, such that the user often will have to switch back and forth between applications, and manually transfer or enter information, in order to enable information from a third party application to be added to information displayed by the mapping application.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to providing mapping information to a user. In particular, various embodiments can determine and provide at least one point of interest (POI) to be displayed on maps provided through a mapping application, where the POIs are selected based at least in part upon information for the user associated with the application. For example, a mapping system or service associated with the application and/or a provider of the application can monitor and obtain information about the user, such as routes the user takes, the types of places a user visits, and other such information, and can use this information to select POIs that are likely to be more relevant to the user based at least in part upon user history. A mapping service can also contact third party services or other data sources that can provide information about the user that can be used to determined POIs that are likely of interest to the user as well.

Further, the mapping service can expose one or more application programming interfaces (APIs) or other such interfaces that enable third party providers to have POI information added to, or displayed with, mapping information provided by the mapping application. For example, a third party content provider might have information that is useful in generating POI data for a type of POI. By enabling that data to be added to the mapping application data, a user, provider, or other such entity can have the ability to include additional types of POI on mapping data, which can potentially be of more interest to a particular user. A selection of types of POI to display also can vary by user, as may be based on stored user information (e.g., historical, behavioral, purchase or viewing, etc.) and/or specific user selections, among other such data.

Various other uses, mechanisms, and approaches are discussed and suggested herein as are described with respect to the various embodiments.

Figure 1:
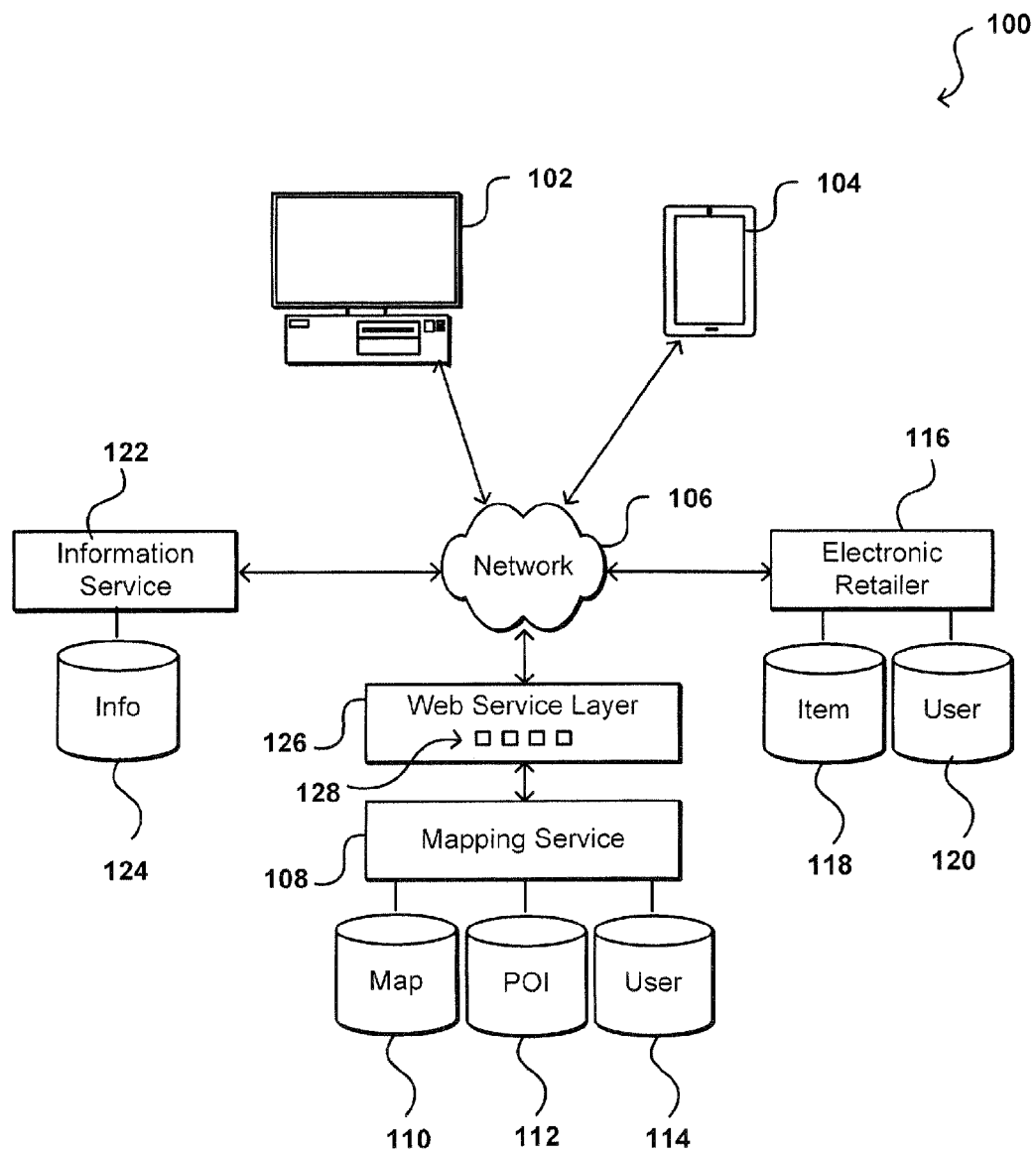
FIG. 1 illustrates an environment in which aspects of the various embodiments can be implemented.

FIG. 1 illustrates an example environment 100 in which a user can obtain mapping information using one or more client devices, in accordance with various embodiments. It should be understood that the example system provides a general overview of basic components, and that there can be many additional and/or alternative components utilized as known or used in the art for the generation, transmission, processing, management, and/or storage of electronic information. In this example, a user is able to utilize a client device 102, such as a personal computer, tablet computer, smart phone, and the like, to access a mapping system or service 108 over at least one appropriate network 106, such as a cellular network, the Internet, or another such network for communicating digital information. In some embodiments, a mapping application will be installed on the client device 102, such that much of the planning, information gathering, or other such aspects can be executed on the client device, while the mapping service 108 is contacted primarily to obtain map tiles (e.g., bitmap or vector), point of interest data, and other such information, which the mapping service might pull from a map data store 110, a point of interest (POI) data store, and/or another such location. The determining of routes between two or more locations can be performed on the client device 102, by the mapping service 108, or a combination thereof. Various other interaction and execution approaches can be utilized as well within the scope of the various embodiments.

A user can use one of the client devices 102, 104 to request, through the mapping application (or a mapping Web site, etc.), specific mapping information. The mapping information can include, for example, graphical map tiles that show a map view of a region around an address, road and area identifying information, and various points of interest that might be displayed on a region of the map being displayed by the application. In many cases, the mapping service 108 will pull the map data from a map data store 110 or other such location, and a portion of a default set of POI stored in a POI data store 112, or other such location. The mapping service might also include a user data store 114 for storing preference, account, or other such information for the user. The mapping service can select the data appropriate for the request, and provide the data back over the at least one network 106 to the client device 102 from which the request originated.

As mentioned, the POI data returned from the mapping service can be selected from a default set of POI determined by a provider of the mapping service, or other such entity. This information can be obtained using conventional approaches, such as by accessing publicly accessible data to obtain information about public locations (e.g., parks and government buildings) or major attractions (ball parks, amusement parks, etc.). The mapping service provider can also provide POI for locations corresponding to businesses or locations with which the mapping service has established a business relationship, whether directly or indirectly. For example, the mapping service might display POI for gas stations or restaurant chains that have paid to be included with the POI data.

Systems and methods in accordance with various embodiments, however, can also enable information from other sources to be included as POIs as well. For example, as illustrated in FIG. 1 the mapping system or service can include at least one Web service layer 126, or other such set of components, which can include one or more APIs 128, or other such interfaces, enabling data from third parties to be used with the mapping service. It should be understood that the Web services layer can include any appropriate components known for receiving and processing Web service requests, as may include Web servers, routers, network infrastructure, and other such components. Further, although an Internet-based service layer is described, it should be understood that other such interface mechanisms can be used as well within the scope of the various embodiments. In this example, one or more third party content providers can use the APIs to inject POI data into the mapping service 108, such that a mapping application executing on a client device 102, 104 can include additional types of POI that might be of more interest to a user of those devices.

As a first example, one of the content providers is an information service 122 that provides a certain type of information that is stored in at least one information data store 124 or other such location. The information can include, for example, housing data, rental data, information about types of organizations or businesses (e.g., doctors, veterinarians, health clinics), or other location specific information. The information also can include information related to interests of the user, such as locations where movies were filmed, locations mentioned in song lyrics, locations where video games or books allegedly took place, and places where certain types of items can be obtained, among many other such options.

In one example, the mapping service might enable the information service 122 to provide information such as doctor locations, clinic locations, and the like, which might be automatically added to map data as POIs. In other embodiments, a user might be able to request certain types of POI from one or more providers. For example, if a user is interested in finding an apartment for rent, the user can select an option to have that type of data shown on a map. When the mapping service provides information for the map, the service can also provide rental information or POI obtained from a provider of that type of POI. In some embodiments, the mapping service can determine whether a user has an account with a provider, and if so can have that information automatically added to the map information. For example, if a user has an account with a service that provides housing prices for the user's real estate, that information might automatically be added to the map data.

Similarly, if the user has an account with a social network, information from the social network can be obtained and used to provide POI on the maps displayed. These POIs can include, for example, friends' houses, places of work, favorite places to visit, etc. In some cases, the actual location of one or more friends (as may be determined by a location of their phone, for example) might also be displayed as a POI. Various other types of information can be displayed as well.

As another example, an electronic retailer 116, or provider of an electronic marketplace, can provide information about products purchased, viewed, or otherwise obtained by the user. If a user of the mapping service also has an account (or the same account) with an electronic retailer, as might be stored in a user data store 120, the mapping service can contact the electronic retailer for information about the user (assuming the user approves, allows, or enables the transfer of such information). For example, the electronic retailer will typically store information about items (products, services, downloads, etc.), in an item data store 118 or other such location, that the user has obtained, borrowed, viewed, or otherwise expressed interest. There might be a number of locations associated with those items that might be presented as POIs to the user. For example, a user buying a toy car might be interested in locations where the user could view the actual car. A user buying a book might be interested in where the book was written or allegedly took place. A user buying clothes of a particular designer might be interested in locations where a user can purchase clothes from that designer. A user who buys coffee drinks or comics might be interested in locations where a user can purchase those types of items. Various other types of location information related to items can be utilized as well within the scope of the various embodiments. The electronic retailer can determine the relevant data from at least one item data store 118, or other such location, to provide to the mapping service.

In the example situation of FIG. 1, the mapping service can obtain a list or set of information about items associated with the user. This can include a list of specific items in which the user has expressed interest, types of items in which the user has expressed interest, related or recommended items, etc. In some cases, information obtained from the retailer might include data necessary to determine various POI that might be able to be provided to a user when the user views an area through the mapping application that is associated with that POI. In at least some embodiments, information for the items (obtained from the retailer or another source) can be geo-coded or otherwise can include location information that can enable that data to be easily ported into, or used by, the mapping service and/or mapping applications. In some cases the mapping service might contact the retailer and/or an information service periodically to obtain such information, while in other embodiments the contact might be made in response to specific actions or events triggered by the user.

Figure 2A:
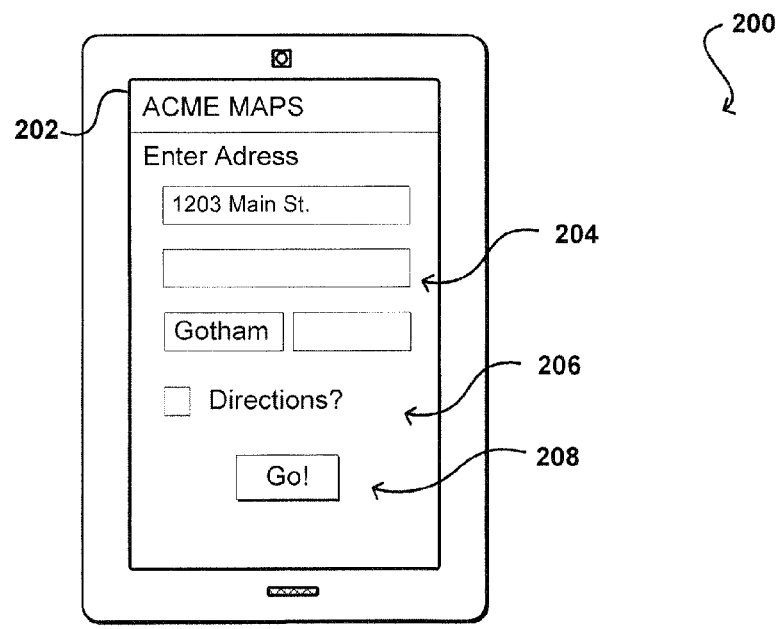
FIGS. 2(a), 2(b), and 2(c) illustrate an example interface displays that can be presented to a user in accordance with various embodiments.

As an example, consider the situation of FIGS. 2(*a*), 2(*b*), and 2(*c*). In the interface state 200 of FIG. 2(*a*), a user has accessed a mapping application and entered an address 204 that the user would like to locate using the mapping application. Various other ways of obtaining information can be used as well, such as by determining a current location of a computing device as determined using a GPS or other such device. Further, options such as an element 206 enabling the user to obtain driving directions from a current, or specified, location can be used as well in various embodiments. In response to the user selecting an element 208 or option to perform the location, the device can determine mapping information for the location, either locally on the device or through a mapping service, or a combination thereof. In response the application on the client device can cause an interface state 220 to be displayed, as illustrated in FIG. 2(*b*), which includes a view of the specified address 222 as well as any surrounding roads, buildings, bridges, railways, and the like, at least within a specified zoom level or level of detail, among other such options. The view can also include one or more points of interest 224 that might be related to the address, specified by the mapping service, or otherwise selected for display to the user as discussed elsewhere herein.

In response to the user requesting information for the address and/or receiving the mapping data associated with that information, data for the change in state can be stored by the mapping service. If the information was located on the client device the information can be sent to the mapping service. If the client requested, and received, the information from the mapping service, the mapping service can cause data for that information to be stored to an appropriate data store. Various other alternatives or combinations can be used as well.

As discussed, the mapping service also can analyze information available about the user that can assist in determining interests, patterns, or other such information useful for selecting POI that might be of interest to the user. For example, in the example view 240 of FIG. 2(*c*) a POI 242 is illustrated that corresponds to a coffee shop. The coffee shop might have been selected as a POI for any of a number of reasons. For example, the user might have made past purchases of coffee, or frequently searches for information relating to coffee, such that "coffee" might be determined to be of interest to the user, and a recommendation service (part of the mapping service, a third party content service, or otherwise) might determine that locations relating to coffee might also be of interest to the user. The user might also be detected, based upon GPS data, access point data, or other such information, to frequently visit coffee shops. Accordingly a recommendation service or engine might determine that the user is likely to be interested in other coffee shops near a location or route the user has entered into a mapping application. In other embodiments, a user might frequent this particular coffee shop and, through machine learning or explicit user input, the device might learn to put a persistent POI at this location because this location is highly relevant to the user.

A similar approach might be utilized to select another POI 228 that is displayed on the map in the view 240 of FIG. 2(*c*). In this example, a comic book store 244 is displayed as a POI. Similar information might be used to select a comic book store, including a user having purchased or expressed an interest in comic books. In other embodiments, a user might belong to a social networking group related to comic books or friends of the social network might have indicated an interest in comic books, such that a recommendation engine might assume the user might be likely to also be interested in comic books. Similarly, the user might frequent movies about comic book heroes or read electronic books relating to superheroes, such that a recommendation service or engine might determine the user might be interested in products offered at a comic book store. In another example, the user might follow a celebrity on a social networking site who is doing an in-store appearance at the comic book store, where the user might have an interest various other approaches can be used as well within the scope of the various embodiments.

The recommendations engine might also learn from user behavior in order to refine the recommendations for POI to be displayed. For example, if a POI is displayed that the user is determined to visit, that type of POI and/or recommendation approach might have a relevance score increased for that user. Similarly, if a user selects a POI for further information, that POI might obtain a higher relevance score. In some cases, a user might have an option to select to see "more like this," for example, where a user can indicate interest in a type of POI. Similarly, the user can delete a POI or provide input like "none like this" to indicate a lack of interest in a certain type of POI. Various other types of feedback can be obtained as well within the scope of the various embodiments.

Figure 3:
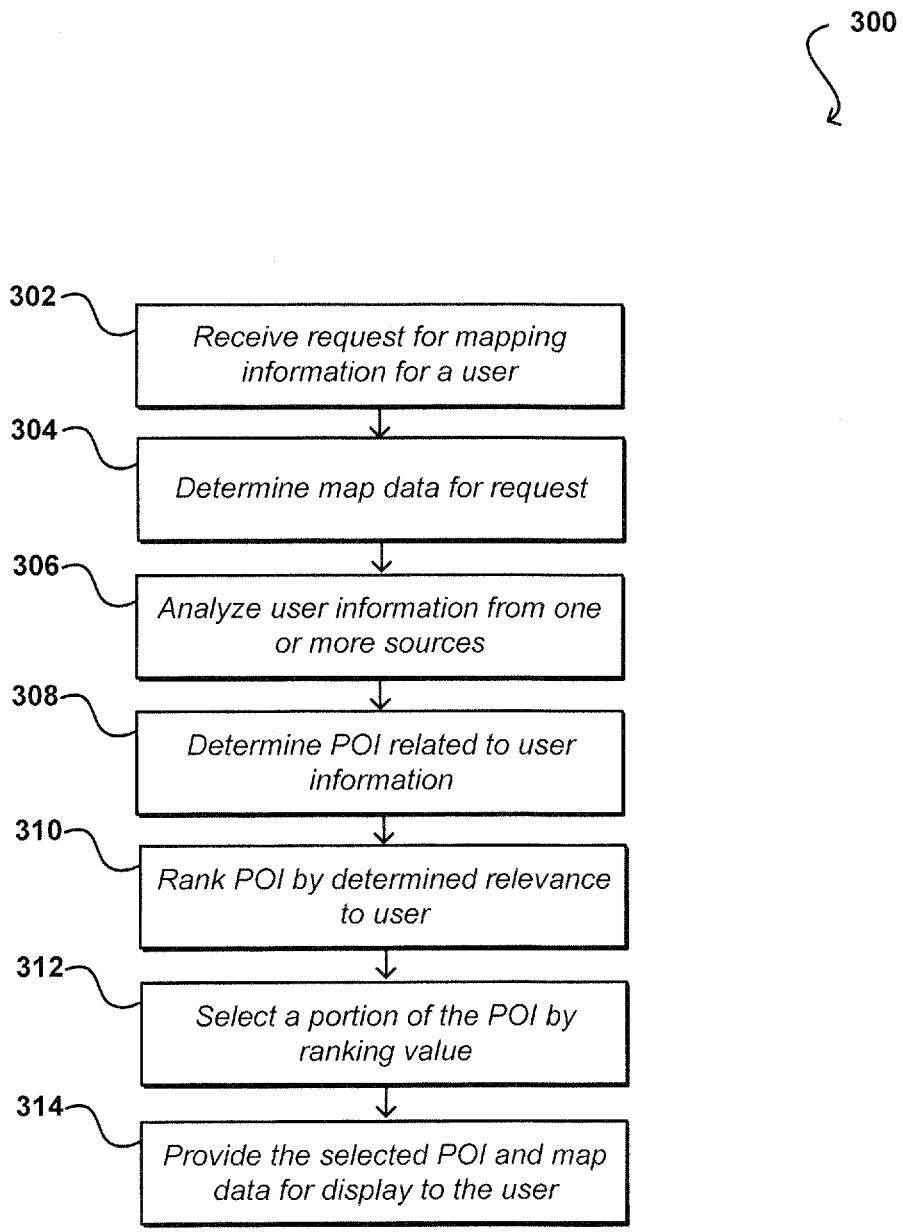
FIG. 3 illustrates an example process for providing personalized mapping information that can be used in accordance with various embodiments.

FIG. 3 illustrates an example process 300 for selecting POI to display to a user that can be used in accordance with various embodiments. It should be understood that, for this and other processes discussed herein, there can be additional, fewer, or alternative steps, performed in similar or alternative steps, or in parallel, within the scope of the various embodiments unless otherwise stated. In this example, a request to execute a mapping application is received 302 for a user. The map data to satisfy the request is determined 304, where the map data can include map tiles, road information, driving directions, and similar such information. In addition, the mapping service can, directly or indirectly, analyze 306 information stored for the user to attempt to determine interests, behavior, or other such information that indicates topics, locations, or subjects that are potentially of interest to the user. Based at least in part upon this user information, as well as a location associated with the map data for the request, POI information related to the location and user information can be determined 308. The POI can be ranked 310 using any of a number of ranking, suggestion, and/or recommendation engines in order to assign scores or values indicating how likely each POI is to be of interest to the user. For example, different factors or weights might be applied based on various factors, such as whether a user has explicitly indicated interest in a POI, has expressed interest in related POIs, etc. These factors can be used to generate a relevance or interest score for each item with respect to that user, for example, and the POIs can be sorted or "ranked" according to these scores. At least a portion of the POI can be selected 312, such as a determined number of the top ranking POI, and the selected POI can be provided 314 with the map data for display to the user. Various other types of information can be utilized and provided as well within the scope of the various embodiments.

Figure 4A:
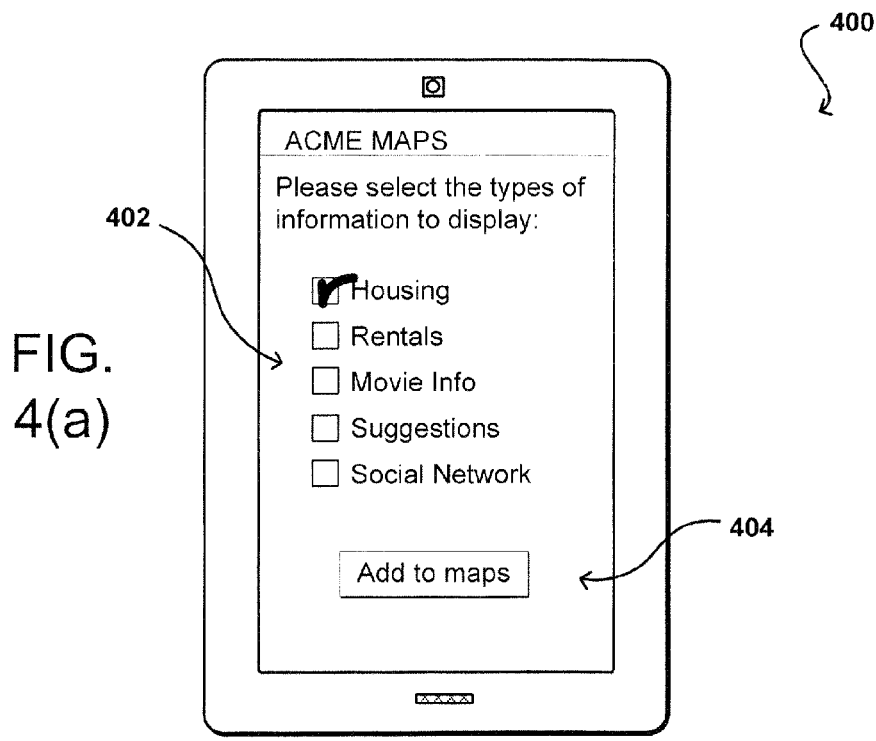
FIGS. 4(a) and 4(b) illustrate displays that can be presented to a user in accordance with various embodiments.

As mentioned above with respect to FIG. 1, providers can also offer various types of POI through a mapping service that can be made available to a user. For example, FIG. 4(*a*) illustrates an example interface view 400 wherein a mapping application enables a user to subscribe to POI from a number of different providers. In this example, options 402 are displayed that enable a user to show POI relating to available housing or rentals, such that as the user is moving around the area the user can view POI for available housing in the area. The user can also subscribe to movie information, which can include locations that are related in some way to the movies, whether locations where stars were born or live, places where movies were filmed, where movie props can now be located, etc.

As another example, the user can suggest a "suggestions" option. This option can enable the mapping service to utilize information from the mapping service and any other appropriate source and suggest POI that the mapping service determines to be most relevant to the user based at least in part upon information known about the user. For example, if the user always takes a certain route between two locations, the device can rank locations along that route more highly. If a user is more likely to visit a type of location at a certain time of day or day of the week, the mapping application can display POI that are more relevant to the user at the current time, or a time input to the mapping application. Similarly, the mapping application can use any other types of information discussed or suggested herein to select POI that might be of interest to the user, where those POI could be of any appropriate category, type, etc.

Another example is a social networking option, which enables the user to receive POI based on things that friends or connections have indicated an interest in. For example, if the user or user's friends have visited, liked, checked-in, or otherwise been associated with a location or type of location, that can be an indication that the user might be interested in similar types of POI. Also, if the user has an account with a social network that rates types of establishments, such as restaurants or boutiques, highly ranked locations on that network can be used to select POI to be displayed. A user checking into or rating a type of establishment can affect the ranking of that type of establishment, as well as how many friends of the network check into, subscribe to feeds about, or follow those establishments. Various other types of information can be used as well.

Figures 2B, 2C:
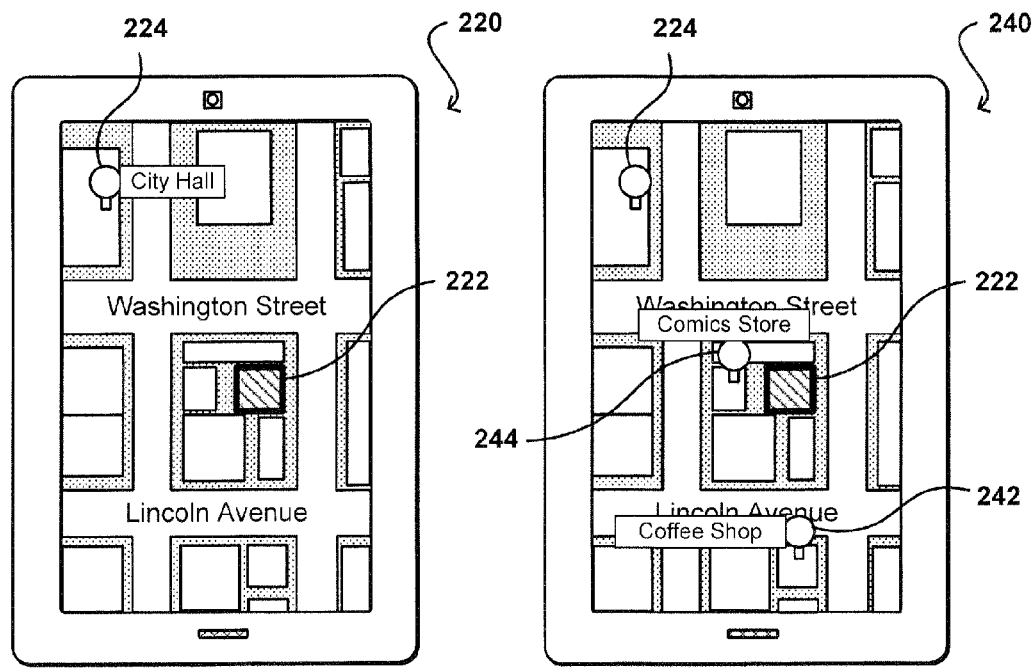
Figure 4B:
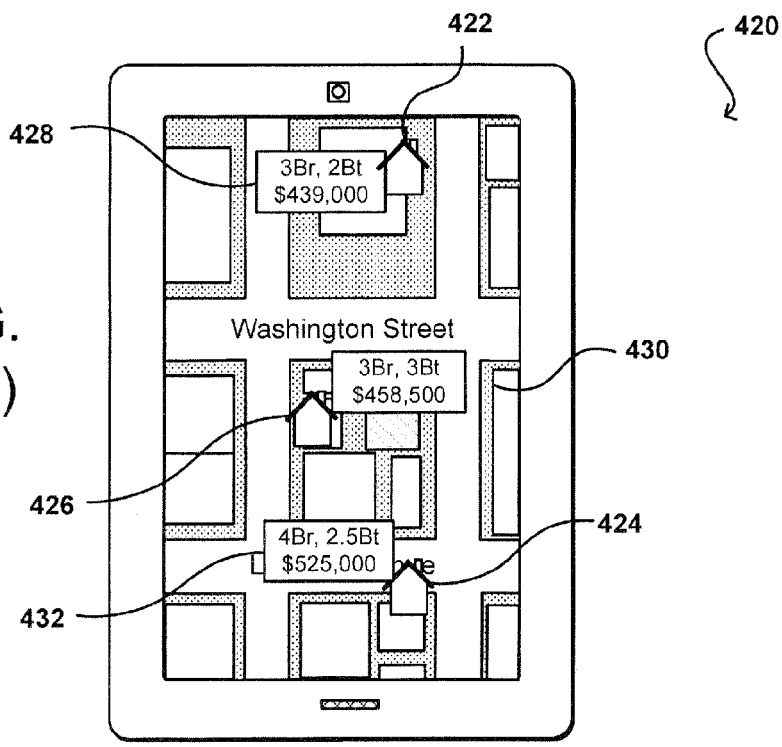

FIG. 4(b) illustrates a view 420 that can be displayed in the mapping application upon the user selecting to view information from a housing information provider. As can be seen, additional POI 422, 424, 426 are displayed that were not visible in the previous views for that location, such as illustrated in FIG. 2(b). In this example, the user can see housing-related POI around a current area of interest. Each POI can have a short message or description 428, 430, 432 indicating some aspect of the housing, as may be decided by the provider, the user, or otherwise. In some cases, the POI can be filtered by user criteria supplied through the mapping application or through a site associated with the information provider. For example, the user might have an account with the information provider that enables the user to specify the size of house the user is looking for, price range, and other such information. The POI selected to be displayed then can be filtered to ensure that the displayed POI meet these criteria (at least within an acceptable amount of deviation, etc.).

Figure 5:
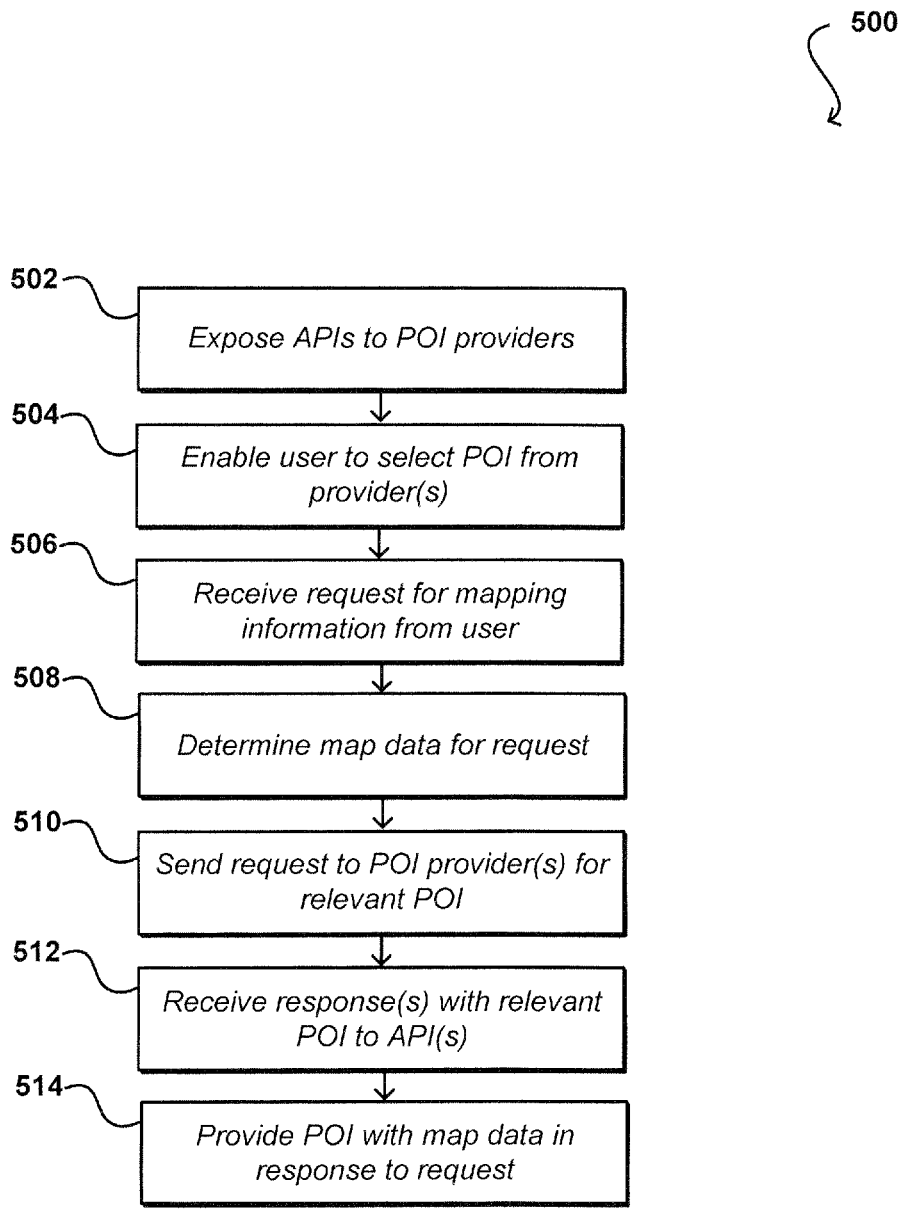
FIG. 5 illustrates an example process for enabling a user to having POI data from third parties included in a display provided by a mapping application that can be provided to in accordance with various embodiments.

FIG. 5 illustrates an example process 500 for providing POI from third parties through a mapping application or application service. In this example, one or more APIs are exposed 502 to third party POI providers. The third party providers can use this information to provide POI data to be incorporated with mapping data for various users. The data provided can already be in POI format, or can include geocoding or other data necessary to enable the corresponding POI format to be generated for that data. In at least some embodiments, the user can be enabled 504 to select to receive POI from one or more providers. The user can make such a selection through the mapping application, through an interface with the mapping service, directly with the third party provider, or using another such approach. When a request for mapping data is received 506 from that user, the map data (e.g., graphic tiles, road names, route information, and default POI) for the request can be determined 508. In at least some embodiments, a user might have the ability to specify to receive certain types of POI from the mapping service provider itself, or the mapping service provider might store information obtained from third party providers. In this example, the mapping service can send 510 a request for POI to one or more POI providers providing a type of POI in which the user has indicated interest. The request can include information such as a user identifier, information about a location or region of the mapping, as well as any criteria for the POI or other such information. One or more responses then can be received 512 with POI data matching the request. The mapping service can then select (directly or using a selection service) at least a portion of the received POI information, and can provide 514 that portion to the client device associated with the user, such that the user can view the POI data. In at least some embodiments, the mapping service will monitor interactions of the user with that POI, and can provide feedback to the relevant third party providers regarding whether the user visited, viewed, or otherwise showed interest in any of the POI. The third party provider can then use this information for purposes such as to adjust scores for various POI, or to adjust selection algorithms or other such aspects. The mapping service can also use this information to determine how much to weight POI recommendations from different services in order to help rank the POI from different sources and determine which POI to display.

In some cases, the user might have an account with a third party provider of POI, which can enable that POI to automatically appear on the mapping information if the mapping service has a relationship with the provider. In some embodiments, the user might have to pay for the third party provider service, or have an account with that provider, in order for that information to appear.

In some embodiments, various providers can offer sets or types of POI available through the mapping application, where the user can subscribe to that type of POI. The user in some embodiments can purchase the set of POI or pay periodically to receive current POI of that type. Such an approach enables third party providers to obtain revenue for providing the POI to the mapping service, enables the mapping service to offer a potentially wide variety of types of POI, and provides the user with the ability to view many different types of POI. The user might subscribe only for a period of time, such as when the user will be in a certain location, or might have a recurring or renewable subscription, among other such options. In some embodiments, the interaction of users with certain types of POI can indicate a current price for different sets of POI, which sets of POI are offered through the marketplace, etc.

Similarly, the APIs exposed by the mapping provider can allow the mapping data to be embedded in applications provided by, or associated with, the third party providers. For example, instead of the user opening a mapping application to view housing data, the user might open the housing data application and receive the familiar mapping information from the mapping service. Such an approach can make the user more comfortable, as the user is using a map with which the user is familiar, and thus can improve the user experience and make the user more likely to use that application.

In some embodiments, users can potentially purchase customized sets of POI from third parties that can be installed on the user's device, uploaded to the cloud, provided to the mapping service for use with the mapping application, etc. In some embodiments, a user might also have the option to generate or customize their own POI. For example, a user can import entries from a contact list or social networking site to have addresses of friends or family members added as POI. The user also can select certain locations as persistent POI, where favorite locations always appear on the map for a certain area and/or certain zoom level, etc. The user can potentially customize the pins or POI markers, such as by applying images or graphics for the POI. Also, the user can potentially customize the message for a given POI. For example, a user might change the name from "Pizza Palace" to "Sausage Stuffed Crust Pizza" or "Mom's favorite place" so the POI message is also more relevant to the user. Various other options can be provided as well.

In some embodiments, a mapping service might also suggest certain subscriptions to a user based on information known about the user. For example, if the user buys a lot of cookbooks or checks into a lot of gourmet restaurants, the mapping service might recommend a subscription to a restaurant-related POI service such that the user can obtain top-rated POI for various locations. Similarly, if the user buys a lot of car parts or books about cars, the mapping service might suggest the user purchase a set of auto-related POI. Some of this data might be obtained from the mapping service data store, but the ability to expand the POI can provide additional locations and/or different information about some of the same locations.

Figure 6:
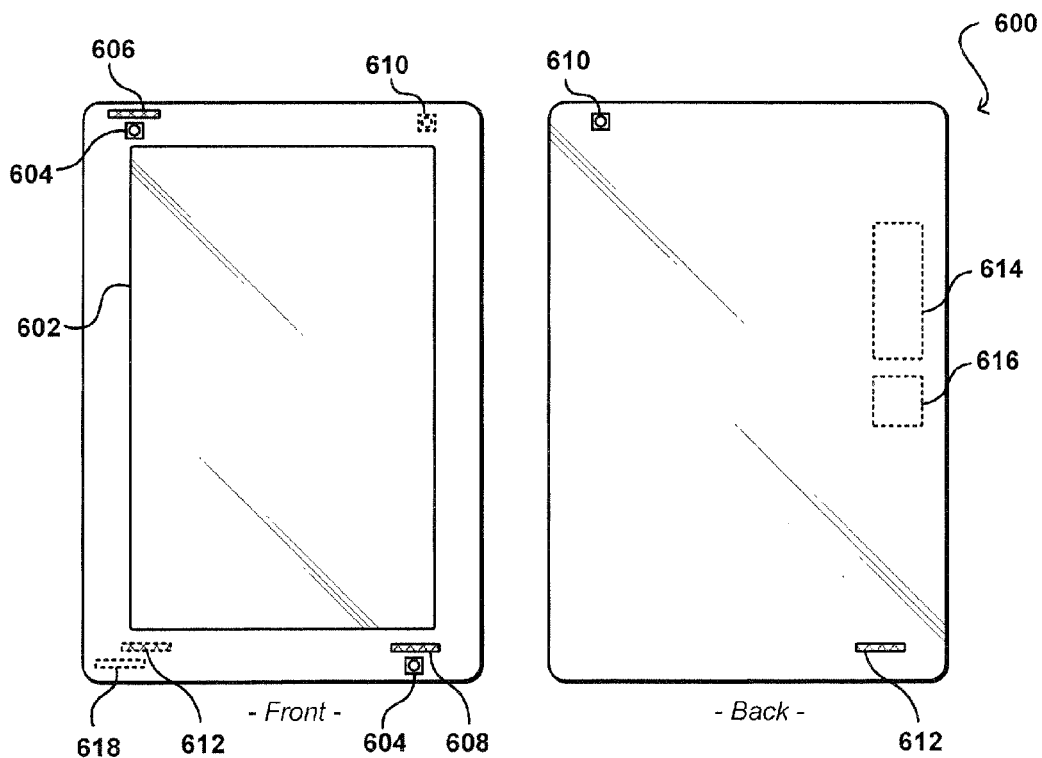
FIG. 6 illustrates an example device that can be used to enable a user to access and request mapping information in accordance with various embodiments.

FIG. 6 illustrates front and back views of an example electronic computing device 600 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 600 has a display screen 602 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 604 on the front of the device and at least one image capture element 610 on the back of the device. It should be understood, however, that image capture elements could also, or alternatively, be placed on the sides or corners of the device, and that there can be any appropriate number of capture elements of similar or different types. Each image capture element 604 and 610 may be, for example, a camera, a charge-coupled device (CCD), a motion detection sensor or an infrared sensor, or other image capturing technology.

As discussed, the device can use the images (e.g., still or video) captured from the imaging elements 604 and 610 to generate a three-dimensional simulation of the surrounding environment (e.g., a virtual reality of the surrounding environment for display on the display element of the device). Further, the device can utilize outputs from at least one of the image capture elements 604 and 610 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 608 on the front side, one microphone 612 on the back, and one microphone 606 on or near a top or side of the device. In some devices there may be only one microphone, while in other devices there might be at least one microphone on each side and/or corner of the device, or in other appropriate locations.

The device 600 in this example also includes one or more orientation- or position-determining elements 618 operable to provide information such as a position, direction, motion, or orientation of the device. These elements can include, for example, accelerometers, inertial sensors, electronic gyroscopes, and electronic compasses.

The example device also includes at least one communication mechanism 614, such as may include at least one wired or wireless component operable to communicate with one or more electronic devices. The device also includes a power system 616, such as may include a battery operable to be recharged through conventional plug-in approaches, or through other approaches such as capacitive charging through proximity with a power mat or other such device. Various other elements and/or combinations are possible as well within the scope of various embodiments.

Figure 7:
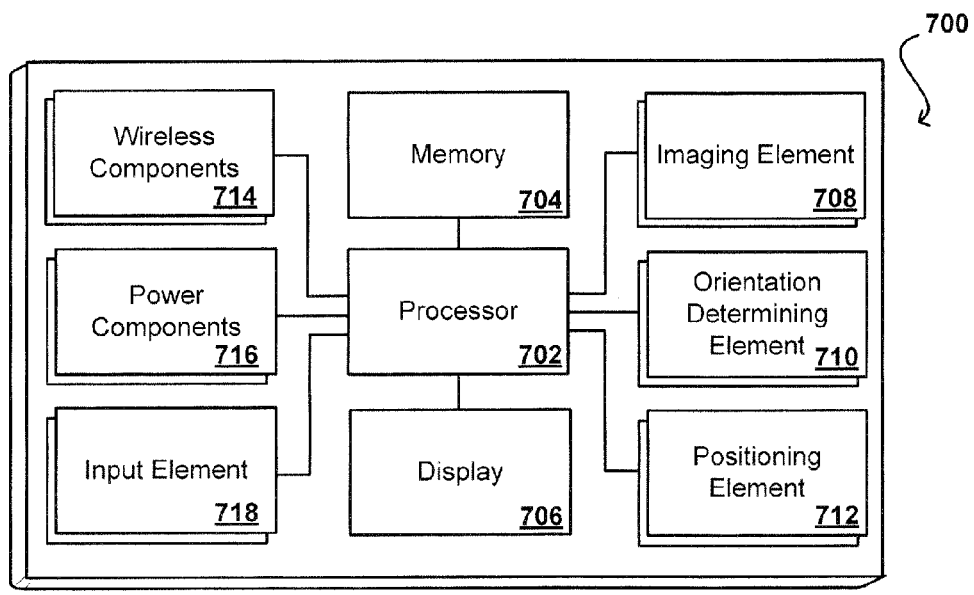
FIG. 7 illustrates example components of a device such as that illustrated in FIG. 6.

FIG. 7 illustrates a set of basic components of an electronic computing device 700 such as the device 600 described with respect to FIG. 6. In this example, the device includes at least one processing unit 702 for executing instructions that can be stored in a memory device or element 704. As would be apparent to one of ordinary skill in the art, the device can include many types of memory, data storage, or computer-readable media, such as a first data storage for program instructions for execution by the processing unit(s) 702, the same or separate storage can be used for images or data, a removable memory can be available for sharing information with other devices, and any number of communication approaches can be available for sharing with other devices.

The device typically will include some type of display element 706, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 708, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 700 also includes at least one orientation determining element 710 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 700. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 712 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 714 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 718 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

As discussed, different approaches can be implemented in various environments in accordance with the described embodiments. As will be appreciated, although a Web-based environment is used for purposes of explanation in at least some examples, different environments may be used, as appropriate, to implement various embodiments. A system can include one or more electronic client devices, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In an Internet-based example, the environment can include a Web server for receiving requests and serving content in response thereto, although for other networks, an alternative device serving a similar purpose could be used, as would be apparent to one of ordinary skill in the art.

An environment can also include at least one application server and at least one data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, depictions of systems discussed herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of providing mapping information, comprising:
   receiving a request from a user of a mapping application executing on a client device, the request includes a location;
   determining mapping data that includes graphical information for rendering a map display of the location;
   determining a first set of point of interest (POI) data associated with the mapping data;
   identifying at least one item offered over an electronic marketplace based on usage data for a user account associated with the electronic marketplace;
   receiving, from a third party POI data service provider through an application programming interface (API), a second set of POI data associated with the mapping data and corresponding to location information related to the at least one item;
   ranking POI instances from the first set of POI data and the second set of POI data based on a relevance value that indicates a level of interest associated with the user;
   selecting one or more POI instances from the first set of POI data and the second set of POI data for display in the mapping application based at least in part on the relevance value; and
   providing the POI instances for display.

2. The computer-implemented method of claim 1, further comprising:
   receiving a request from the user to obtain a type of POI data provided by the third party POI data service provider.

3. The computer-implemented method of claim 1, further comprising:
   receiving at least one selection criterion from the user; and
   filtering the POI instances based on the at least one selection criterion.

4. The computer-implemented method of claim 1, further comprising:
   monitoring a behavior of the user with respect to at least one of the mapping data or the POI instances to determine at least a portion of the usage data.

5. The computer-implemented method of claim 1, wherein the usage data is at least partially obtained from at least one third party source.

6. A computer-implemented method, comprising:
   under control of one or more computer systems configured with executable instructions,
   receiving a request for mapping information to be displayed to a user, the request includes a location;
   identifying one or more items of an electronic marketplace based on usage data for a user account associated with the electronic marketplace;
   selecting a first set of point of interest (POI) data associated with the mapping information;
   receiving, from a third party POI data service provider, a second set of POI data associated with the mapping data and corresponding to location information related to the one or more items;
   ranking POI instances from the first set of POI data and the second set of POI data based on a relevance value that indicates a level of interest associated with the user; and
   selecting one or more POI instances from the first set of POI data and the second set of POI data for display based at least in part on the relevance value.

7. The computer-implemented method of claim 6, further comprising:
   determining the usage data based at least in part upon at least one of a past behavior of the user, past purchases of the user, information about items the user has viewed or searched, explicit user indications, or preference information for the user.

8. The computer-implemented method of claim 6, further comprising:
   enabling a user to specify information for a POI instance to be included in the POI instances.

9. The computer-implemented method of claim 8, further comprising:
   receiving the information for the POI instance by at least one of manual entry by the user, importing by a mapping application, or obtaining from another source.

10. The computer-implemented method of claim 6, wherein the POI instances are received through at least one application programming interface (API) from the third party POI data service provider.

11. The computer-implemented method of claim 6, wherein the POI instances are received through the user subscribing to POI data provided by the third party POI data service provider, having an account with the third party POI data service provider, or purchasing POI data from the third party POI data service provider.

12. A computer-implemented method, comprising:
   providing a mapping service that allows a user to obtain mapping data via a mapping application;
   exposing at least one interface of the mapping application to a third party point of interest (POI) data service provider to provide POI data capable of being displayed by the mapping application;
   determining a first set of POI data that corresponds to a location specified by a user request for the mapping data;
   identifying one or more items offered over an electronic marketplace based on usage data for a user account associated with the electronic marketplace;
   obtaining a second set of POI data from the third party POI data service provider, the second set of POI data is associated with the location specified by the user request and corresponds to location information related to the one or more items of the electronic marketplace;
   ranking POI instances from the first set of POI data and the second set of POI data based on a relevance value that indicates a level of interest associated with the user;
   selecting one or more POI instances for display by the mapping application from the first set of POI data and the second set of POI data based at least in part on the relevance value; and
   sending the POI instances with the mapping data for display to the user.

13. The computer-implemented method of claim 12, further comprising:
receiving a request for the mapping data from a third party application associated with the third party POI data service provider through the at least one interface; and
providing the mapping data through the at least one interface in response to the request, wherein the third party application is operable to display the mapping data via the third party application.

14. The computer-implemented method of claim 12, further comprising:
determining whether the user subscribed to the second set of POI data from the third party POI data service provider.

15. The computer-implemented method of claim 12, further comprising:
determining the ranking score for the POI instances based at least in part upon interest data associated with the user.

16. The computer-implemented method of claim 15, further comprising:
updating the POI instances display in response to a change in view of the mapping data in the mapping application.

17. A computing system, comprising:
a processor; and
a memory device including instructions that, when executed by the processor, cause the computing system to:
receive a request for mapping information to be displayed to a user;
identify one or more items of an electronic marketplace based on usage data for a user account associated with the electronic marketplace;
select a first set of point of interest (POI) data associated with the mapping information;
receive, from a third party POI data service provider, a second set of POI data associated with the mapping information and corresponding to location information related to the one or more items;
rank POI instances from the first set of POI data and the second set of POI data based on a relevance value that indicates a level of interest associated with the user; and
select one or more POI instances from the first set of POI data and the second set of POI data for display with the mapping information based at least in part on the relevance value.

18. The computing system of claim 17, further comprising:
determining the usage data based at least in part on at least one of a past behavior of the user, past purchases of the user, information about items the user has viewed or searched, user selections, or preference information for the user.

19. The computing system of claim 17, wherein the POI instances are received through at least one application programming interface (API) from the third party POI data service provider.

20. A non-transitory computer-readable storage medium storing instructions that, when executed by at least one processor of a computing system, enable the computing system to:
provide a mapping service that allows a user to obtain mapping data via a mapping application;
expose at least one interface of the mapping application to a third party point of interest (POI) data service provider to provide POI data capable of being displayed by the mapping application;
determine a first set of POI data that corresponds to a location specified by a user request for the mapping data;
identify one or more items offered over an electronic marketplace based on usage data for a user account associated with the electronic marketplace;
obtain a second set of POI data from the third party POI data service provider, the second set of POI data is associated with the location specified by the user request and corresponds to location information related to the one or more items of the electronic marketplace;
rank POI instances from the first set of POI data and the second set of POI data based on a relevance value that indicates a level of interest associated with the user;
select one or more POI instances for display by the mapping application from the first set of POI data and the second set of POI data based at least in part on the relevance value; and
send the POI instances with the mapping data for display to the user.

21. The non-transitory computer-readable storage medium of claim 20, wherein the instructions when executed further cause the computing system to:
receive a request for the mapping data from a third party application associated with the third party POI data service provider through the at least one interface; and
provide the mapping data via the at least one interface in response to the request, wherein the third party application is operable to display the mapping data.

22. The non-transitory computer-readable storage medium of claim 20, wherein the instructions when executed further cause the computing system to:
determine whether the user subscribed to the second set of POI data from third party POI data service provider.

23. The non-transitory computer-readable storage medium of claim 20, wherein the instructions when executed further cause the computing system to:
determine the ranking score for the POI instances based at least in part upon interest data associated with the user.

* * * * *